US007307523B2

(12) United States Patent
Kister et al.

(10) Patent No.: US 7,307,523 B2
(45) Date of Patent: Dec. 11, 2007

(54) MONITORING MOTIONS OF ENTITIES WITHIN GPS-DETERMINED BOUNDARIES

(75) Inventors: Thomas F. Kister, Chalfont, PA (US); William J. Garrison, Warminster, PA (US); Glen P. Goffin, Dublin, PA (US); David C. Goodwin, Holland, PA (US); Charles R. Hardt, Lawrenceville, GA (US)

(73) Assignee: General Instrument Corporation, Horsham, PA (US)

( * ) Notice: Subject to any disclaimer, the term of this patent is extended or adjusted under 35 U.S.C. 154(b) by 219 days.

(21) Appl. No.: 11/274,653

(22) Filed: Nov. 15, 2005

(65) Prior Publication Data

US 2007/0109133 A1 May 17, 2007

(51) Int. Cl.
*G08B 1/08* (2006.01)
*H04Q 7/00* (2006.01)

(52) U.S. Cl. .............................. 340/539.13; 340/572.1; 340/572.4; 340/686.1

(58) Field of Classification Search ........... 340/539.13, 340/571, 572.1, 572.4, 686.1, 3.1, 5.2, 5.92, 340/825.36, 825.49, 573.1; 706/15, 48
See application file for complete search history.

(56) References Cited

U.S. PATENT DOCUMENTS

| | | | | |
|---|---|---|---|---|
| 6,919,803 | B2 * | 7/2005 | Breed | 340/539.14 |
| 7,151,445 | B2 * | 12/2006 | Medve et al. | 340/539.15 |
| 2005/0027604 | A1 * | 2/2005 | Bandy et al. | 705/22 |
| 2007/0001854 | A1 * | 1/2007 | Chung et al. | 340/572.1 |

OTHER PUBLICATIONS

"wOz: Meeting Today's Challenges with Tomorrow's GPS Technology," Wheels of Zeus, http://woz.com/2005/about.html, 1 page, accessed Oct. 24, 2005.

* cited by examiner

*Primary Examiner*—Toan N. Pham
(74) *Attorney, Agent, or Firm*—Benjamin D Driscoll

(57) ABSTRACT

A method for monitoring motion of an entity within a predetermined boundary established using a location detection technology. Sensor data is acquired from a motion sensor that senses non-positional movement of the entity and is attachable to the entity. A learned movement pattern associated with the entity is accessed. Computing techniques are used to analyze the acquired sensor data in relationship to the learned movement pattern. A current movement pattern is identified based on the analysis. It is determined whether the current movement pattern is a reportable movement pattern, and if so, a predetermined action is performed.

20 Claims, 5 Drawing Sheets

10

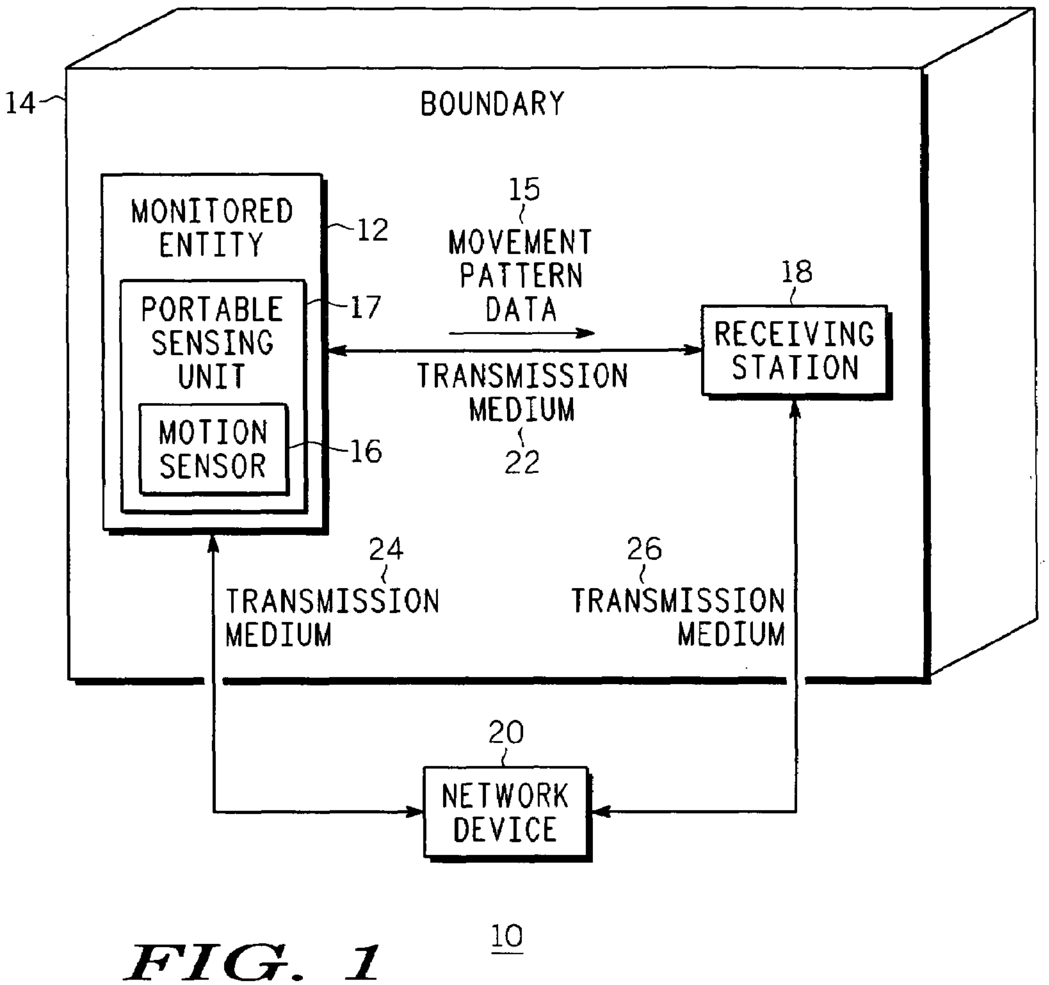
FIG. 1
FIG. 2
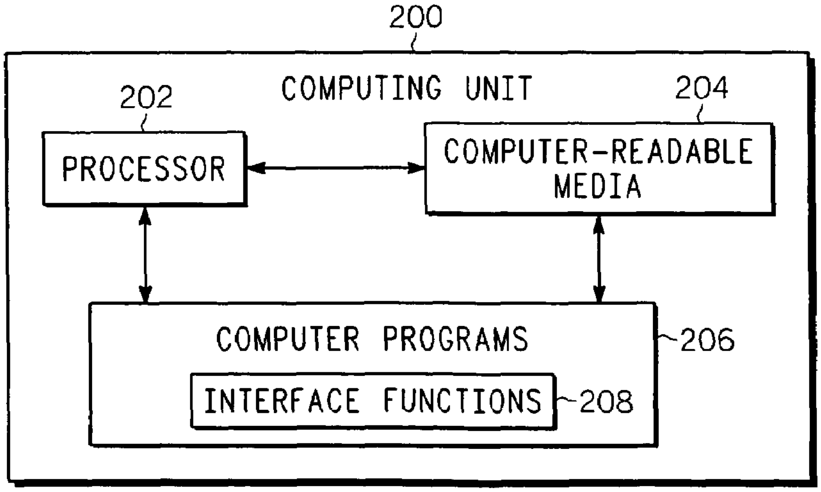

MONITORING MOTIONS OF ENTITIES WITHIN GPS-DETERMINED BOUNDARIES

BACKGROUND

Global Positioning System ("GPS") technology has been widely used to identify positions of objects in applications in the areas of national defense, surveying, public safety, telecommunications, environmental management, and navigation (aviation-, marine-, and land-based navigation applications, for example). The commercial availability of inexpensive, powerful GPS receivers has also made GPS-based technologies, and other location-based technologies, attractive for use in smaller-scale consumer applications.

The Wheels of Zeus™ (wOz™) technology platform, designed to track the location of an asset within a user-defined physical area, is one example of a GPS-based application available to consumers. The wOz technology platform includes, among other things, a "Smart Tag", a "Tag Detector", and the "wOz Service". In operation, the Smart Tag is attached to a person or an object. The Tag Detector wirelessly monitors the location of the Smart Tag within a user-defined physical area. The wOz Service communicates with the Tag Detector via a network to provide various monitoring, tracking, and control parameters—a user may be notified, for example, when the Smart Tag is taken beyond the user-defined physical area.

GPS-enabled asset tracking systems such as the wOz technology platform are not known to identify, or to alert users to, an asset's non-positional (for example, three-dimensional) movements within a monitored physical area—they generally cannot alert users when an asset experiences an unusual movement Thus, valuable information regarding many activities that happen at seemingly innocuous locations or times—some of which signify serious safety threats—may go unreported despite their occurrence wholly within the monitored area. For example, dependents (such as children, pets, or elderly people) may display abnormal or distinctive motion patterns when they are in distress (for example, when falling). Such motion patterns are not detected by asset tracking systems that report information related only to the location of assets relative to a particular physical area.

BRIEF DESCRIPTION OF THE DRAWINGS

FIG. 1 is a block diagram illustrating exemplary elements of a system for monitoring motion of an entity within a predetermined boundary.

FIG. 2 is a block diagram of a general purpose computing unit, illustrating components that are accessible by, or included in, certain elements of the system shown in FIG. 1.

DETAILED DESCRIPTION

Figure 3:
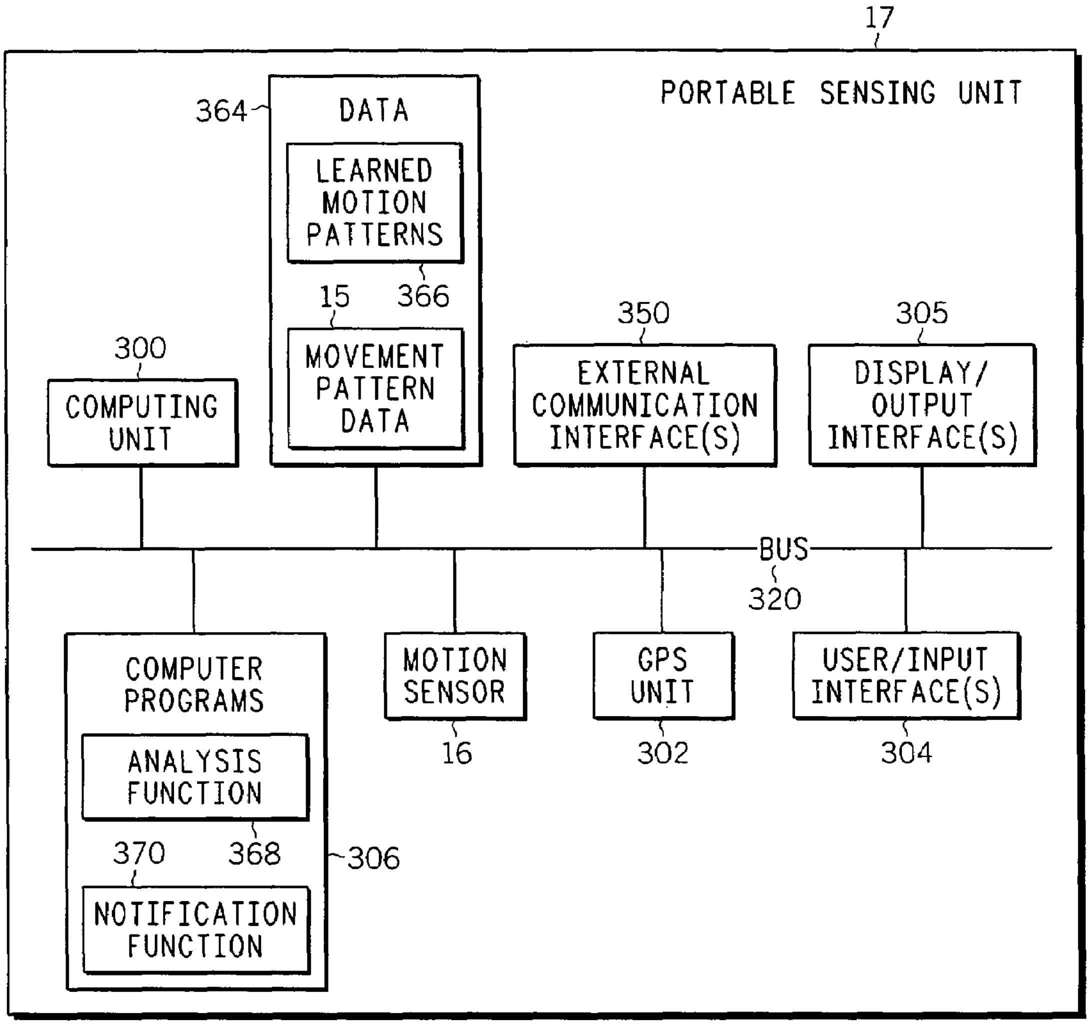
FIG. 3 is a block diagram of an exemplary internal configuration of the portable sensing unit shown in FIG. 1.

Methods, devices, systems and services for monitoring motion of an entity within a predetermined boundary established using GPS- or other location-based technologies are described. Data is acquired from a motion sensor, such as a micro-electro-mechanical systems ("MEMS") sensor like an accelerometer or a gyroscope, which is attachable to the entity. A learned movement pattern (a trained pattern or a pre-programmed pattern, for example) associated with the entity is accessed, and computing techniques (such as neurocomputing techniques like pattern classification techniques) are used to analyze the acquired data in relationship to the learned movement pattern. A particular movement pattern (including the case where there is no movement)is identified based on the analysis. If it is determined that the particular movement pattern is a reportable movement pattern, a predetermined action is performed.

The reportability of a movement pattern may depend on when or where a movement pattern occurs. Temporary time- or location-based boundaries may be established. In one example, areas around sprinklers may be deemed out-of-bounds when the sprinklers are on. In another example, the backyard may be made out-of-bounds during spring months when it may be muddy. In yet another example, certain boundaries may be established using input from other physical-based monitoring systems such as security alarm systems or appliance monitoring systems (the kitchen may be out-of-bounds when the oven is on, for example, or the area outside the house may be out-of-bounds except when accessed by the front door). Boundaries may also be established by interactions between multiple assets—another motion sensor, such as one worn by a neighbor, may not be allowed within a certain distance of the monitored motion sensor, for example. Manual set-up options are also possible.

The action taken when a particular movement is a reportable movement pattern may include notifying a user of the monitoring system (or a service associated therewith) that the reportable movement pattern occurred, or performing a control operation, such as turning off an appliance like a sprinkler or an oven. Notification may be provided in a number of ways—visible or audible signals may be received on a local output device, or a communication modality such as an email service, an Internet-based service, a telecommunication service, or a short-messaging service may be configured to notify the user.

The foregoing information is provided to introduce a selection of concepts in a simplified form. The concepts are further described below. Elements or steps other than those described above are possible, and no element or step is necessarily required. The above information is not intended to identify key features or essential features of the claimed subject matter, nor is it intended for use as an aid in determining the scope of the claimed subject matter.

Turning now to the drawings, where like numerals designate like components, FIG. 1 is a block diagram illustrating exemplary elements of a system 10 for monitoring motions of an entity 12 within a predetermined boundary 14. Entity 12 is a person or a tangible object. Boundary 14 is a physical area defined through the use of a position detection technology, such as a Global Positioning System ("GPS")-based technology. In operation, system 10 analyzes motion patterns of entity 12 within boundary 14, and notifies a user (not shown) of system 10, or a user of a service associated with system 10, when entity 12 engages in certain motion patterns.

A motion sensor 16, which is attachable to entity 12, is shown for exemplary purposes as being disposed within a portable sensing unit 17. Portable sensing unit 17 is operable to communicate with a receiving station 18 via a transmission medium 22. Transmission medium 22 is a local radio frequency communication channel or protocol, or another type of transmission media used to transmit movement pattern data 15 or other information. Portable sensing unit 17 and receiving station 18 are responsive to a network device 20 via transmission media 24 and 26, respectively. Transmission media 22, 24, and 26 may be any suitable local or networked, public or private, wired or wireless information delivery infrastructure or technology. An example of wired information delivery infrastructure is electrical or coaxial cable that may connect a normally stationary entity 12 to a receiving station 18 or a network device 20.

The exterior profile of portable sensing unit 17 is generally small—having a shape that is easily carried by, or attached to, a person or an object. Receiving station 18 may assume any desired exterior profile, but in one example resembles a portable phone in size and shape—a stationary base device (not shown) may communicate with a portable user interface device (not shown) generally within a boundary 14 or within a few hundred feet thereof. Network device 20 is generally a remote device (although network device 20 may be disposed within boundary 14) capable of receiving, processing, and presenting to a user relatively large quantities of data produced by portable sensing unit 17 and/or receiving station 18. Network device 20 may be, for example, a home or office personal computer or a server on a network such as the Internet, or one or more computer programs (discussed further below) operating thereon. Network device 20 may be operated or controlled by a user of receiving station 18, or by a third party, such as a provider of monitoring services.

FIG. 2 is a block diagram of a general purpose computing unit 200, illustrating certain functional components that may be accessible by, or included in, the various elements shown in FIG. 1. Components of computing unit 200 may be accessible by, or included in, portable sensing unit 17, receiving station 18, or network device 20.

A processor 202 is responsive to computer-readable storage media 204 and to computer programs 206. Processor 202 controls functions of an electronic device by executing computer-executable instructions.

Computer-readable storage media 204 represents any number and combination of local or remote devices, now known or later developed, capable of recording or storing computer-readable data. In particular, computer-readable storage media 204 may be, or may include, a read only memory ("ROM"), a flash memory, a random access memory ("RAM"), any type of programmable ROM ("PROM"), a hard disk drive, any type of compact disk or digital versatile disk, a magnetic storage device, or an optical storage device.

Computer programs 206 represent computer-executable instructions, which may be implemented as software components according to well-known software engineering practices for component-based software development, and encoded in computer-readable media (such as computer-readable media 204). Computer programs 206, however, represent any signal processing methods or stored instructions that electronically control functions of elements of system 10 (shown in FIG. 1), and as such may be implemented in software, hardware, firmware, or any combination thereof.

Interface functions 208 represent aspects of the functional arrangement(s) of one or more computer programs 206 pertaining to the receipt and processing of movement pattern data 15 (shown in FIG. 1) and associated information. Among other things, interface functions 208 facilitate receipt and processing of movement pattern data 15.

Interface functions 208 also represent functions performed when data communicated to or from elements of system 10 traverses a path of network devices. As such, interface functions 208 may be functions related to one or more of the seven vertical layers of the well-known Open Systems Interconnection ("OSI") Model that defines internetworking. The OSI Model includes: layer 1, the Physical Layer; layer 2, the Data Link Layer; layer 3, the Network Layer; layer 4, the Transport Layer; layer 5, the Session Layer; layer 6, the Presentation Layer; and layer 7, the Application Layer. For example, interface functions 208 may include data interfaces, operations support interfaces, radio frequency interfaces, and the like.

FIG. 3 is a block diagram of an exemplary internal configuration of portable sensing unit 17. Portable sensing unit 17 includes or accesses components of computing unit 200 (shown in FIG. 2), including processor 202, computer-readable media 204, and computer programs 206. In implementation, portable sensing unit 17 may include each component shown in FIG. 3, or may include fewer, different, or additional components. When components of portable sensing unit 17 (or of any device described herein), such as components of computing unit 200, are referred to as being accessed by portable sensing unit 17, such components need not be present within the unit itself. For example, portable sensing unit 17 may include certain basic functionality, such as motion sensor 16 and a position detector (discussed further below), while other functionality, such as certain processing or data storage functionality, may be located within other elements of system 10 and accessed remotely, such as within receiving station 18 or network device 20.

One or more internal buses 320, which are well-known and widely available elements, may be used to carry data, addresses, control signals and other information within, to, or from portable sensing unit 17.

The exterior housing (not shown) of portable sensing unit 17 is configured for attachment to a person or an object. The exterior housing may be made of any suitable material, and may assume any desired shape. For example, the exterior of portable sensing unit 17 may be a rectangular- or oval-shaped plastic housing, which may be clipped onto a person's clothing, hung around a person's neck, slipped into a person's pocket, attached to a person or object using a belt-like device, or placed in or on packaging associated with an object.

Figure 4:
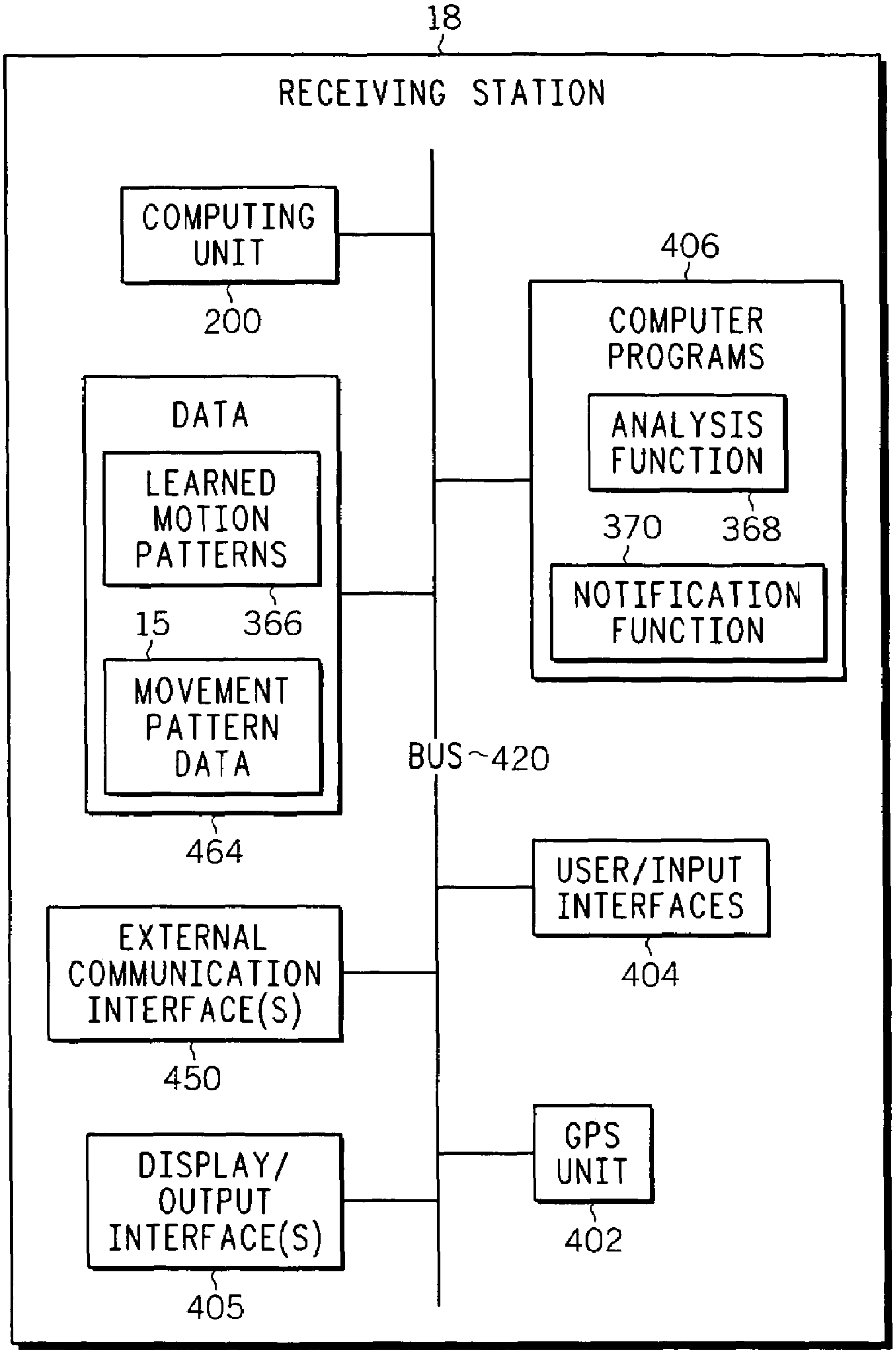
FIG. 4 is a block diagram of an exemplary internal configuration of the receiving station shown in FIG. 1.

Portable sensing unit 17 uses a position detector, such as GPS unit 302 (alone or in combination with a position detector within receiving station 18 such as GPS unit 402, which is shown in FIG. 4 and discussed further below) to (1) define a physical boundary in accordance with user-input information, and (2) capture a position vector of an entity moving within the defined boundary. Several types of commercially available GPS receivers, or components thereof, may serve as GPS unit 302. GPS unit 302 may communicate with, control, or be controlled by, GPS unit 402. User-input information, which is used to configure or control various aspects of the operation of portable sensing unit 17 in addition to being used to define a particular physical boundary, may be collected using any type of now known or later-developed user/input interface(s) 304 such as a remote control, a mouse, a stylus, a keyboard, a microphone, or a display.

Motion sensor 16 is configured to dynamically sense the motion of the entity to which it is attached. Based on the motion of the entity, motion sensor 16 outputs movement pattern data 15 (movement pattern data 15 is shown in block 364, which is discussed further below). For exemplary purposes, motion sensor 16 is implemented by an accelerometer. Several types of suitable accelerometers are commercially available, such as gyroscope accelerometers, pendulous accelerometers, liquid level accelerometers, acceleration threshold switches, and variable capacitance accelerometers like micro-electro-mechanical systems ("MEMS") accelerometers.

In an alternative to using commercially available accelerometers alone, a calculation of acceleration may be used, either alone or in conjunction with commercially available accelerometers, to determine a complete description of the motion of the entity to which the accelerometer is attached. For example, a calculation of acceleration may be performed using the position, velocity and acceleration data collected by GPS unit 302 and/or GPS unit 402 (discussed further below) as a function of time. Because a GPS receiver periodically captures a position vector of a moving object, the rate of change of the position vector data may be calculated to determine a velocity vector of the object, and the rate of change of the velocity vector represents the three-dimensional acceleration of the object.

Block 364 illustrates examples of data—related to portable sensing unit 17's specific role in performing the function(s) of system 10 (shown in FIG. 1)—that may be stored on one or more types of computer-readable media 204 within, or accessible by, portable sensing unit 17. Such data may include, but is not limited to, movement pattern data 15 from motion sensor 16, and learned motion patterns 366.

Learned motion patterns 366 represent trained or pre-programmed motion patterns associated with a particular entity to which portable sensing unit 17 is attached.

Trained motion patterns are subsets of motion pattern data 15 obtained through the field use of portable sensing unit 17. Trained motion patterns are used for analysis purposes (discussed further below) to identify particular movement patterns from among data representing general movements of a given monitored entity.

One type of trained motion pattern is a particular pattern of movement performed for a predetermined purpose, such as a signal for assistance. For example, a dependent such as a child may perform a particular movement pattern, such as waving his arms or jumping up and down, when he needs help. To create a learned motion pattern 366 representing the child's signal, portable sensing unit 17 is attached to the child, and the child performs the specific body movements comprising the selected pattern of motion. Motion sensor 16 produces motion pattern data 15 (for example, maximum and minimum acceleration data and time delays) that represents the child's signal, and the motion pattern data 15 is saved as one or more learned motion patterns 366.

Another type of trained motion pattern is obtained when a monitored entity wears portable sensing unit 17 continually during normal activities. Motion pattern data 15 obtained through regular use of portable sensing unit 17 is analyzed and used to identify 'normal' motion patterns of the entity, and to distinguish such normal motion patterns from 'abnormal' motion patters. Examples of abnormal motion patterns of a child may include sudden accelerations or decelerations (caused by falls, or by being carried away by a car or an adult, for example), and climbing or being raised to a dangerous or suspicious height. Motion pattern data associated with normal (or abnormal) motion patterns may also be saved as one or more learned motion patterns 366.

Pre-programmed motion patterns are produced through the use of traditional programmed computing techniques. Certain motion patterns of an entity—prolonged inactivity, for example—are simple enough that they may be described using algorithms represented by traditional computer programs.

Block 306 illustrates certain aspects of the functional arrangements of computer programs 206 related to portable sensing unit 17's specific role in performing the function(s) of system 10 (shown in FIG. 1). Such computer programs may include, but are not limited to, Analysis Function 368 and Notification Function 370.

Analysis Function 368 represents one or more data analysis functions. Such functions may be implemented using neurocomputing technology or other computing technologies or techniques, such as rules-based techniques that use fuzzy logic. When Analysis Function 368 is implemented using neurocomputing technology, block 368 represents aspects of a neural network that takes learned motion patterns 366 and movement pattern data 15 as inputs, and uses classification techniques, such as pattern classification techniques, to identify certain movement patterns within movement pattern data 15. Classification techniques may be used to determine, for example, whether particular data identified within movement pattern data 15 is similar to, or different from, a learned movement pattern 366, and whether or not the identified data is a critical movement pattern of the monitored entity, worthy of reporting to a user of a device or service associated with system 10.

Notification Function 370 represents aspects of one or more computer programs that cause a user of a device or service associated with system 10 to be notified of critical movement patterns identified by Analysis Function 368. Notifications and information related thereto may be provided in a variety of forms (audible, visible, or in a particular data format, for example) via display/output interface(s) 305. Display/output interface(s) 305 use well-known components, methods and techniques to receive and render information.

External communication interface(s) 350 may be used to enhance the ability of portable sensing unit 17 to receive or transmit information. External communication interface(s) 350 may be, or may include, elements such as cable modems, data terminal equipment, media players, data storage devices, personal digital assistants, or any other device or component/combination thereof, along with associated network support devices and/or software. For example, certain external communication interface(s) 350 may be adapted to provide user notification of critical movement patterns through a variety of communication techniques now known or later developed—email, the Internet, telecommunication services, short-messaging services, and the like.

FIG. 4 is a block diagram of an exemplary internal configuration of receiving station 18 (shown in FIG. 1). Receiving station 18 includes or accesses components of computing unit 200 (shown in FIG. 2), including processor 202, computer-readable media 204, and computer programs 206. One or more internal buses 420, which are well-known and widely available elements, may be used to carry data, addresses, control signals and other information within, to, or from receiving station 18.

The exterior housing (not shown) of receiving station 18 is configured for handheld or stationary operation within a predetermined boundary. Receiving station 18 uses GPS unit 402 (alone or in combination with GPS unit 302, shown in FIG. 3) to (1) define the predetermined boundary, and (2) receive the position vector of the entity to which portable sensing unit 17 is attached, as the entity moves within the predetermined boundary. The position vector could be generated and/or determined by sensing unit 17 and transmitted to receiving station 18, or receiving station 18 may receive raw data, and calculate the position vector itself. In a further alternative, the position vector or data from which the position vector may be determined may pass through to network device 20. Several types of commercially available GPS receivers, or components thereof, may serve as GPS unit 402. GPS unit 402 may communicate with, control, or be controlled by, GPS unit 302—for example, GPS unit 402 may issue control-type instructions to GPS unit 302, or vice-versa, regarding the collection, receipt, and processing of position data.

Receiving station 18 is configured to receive movement pattern data 15 (movement pattern data 15 is shown in block 464, which is discussed further below) from portable sensing unit 17 via transmission medium 22 (shown in FIG. 1). Movement pattern data 15 may be received dynamically (in near real-time, for example), or it may be periodically downloaded. The particular application may determine how often receiving station 18 receives movement pattern data 15. For example, for monitored entities that normally remain stationary, such as items of art or electronics, movement pattern data 15 may be downloaded periodically; in more time-sensitive applications, such as when children are playing in the yard, receiving station 18 may receive movement pattern data in near real-time. Receiving station 18 may also calculate acceleration of the entity to which portable sensing unit 17 is attached, using acceleration data collected by GPS unit 402 or GPS unit 302.

Block 464 illustrates examples of data—related to receiving station 18's specific role in performing the function(s) of system 10 (shown in FIG. 1)—that may be stored on one or more types of computer-readable media 204 within, or accessible by, receiving station 18. Such data may include, but is not limited to, movement pattern data 15 and learned motion patterns 366 (shown and discussed in connection with FIG. 3).

Block 406 illustrates certain aspects of the functional arrangements of computer programs 206 related to receiving station 18's specific role in performing the function(s) of system 10 (shown in FIG. 1). Such computer programs include, but are not limited to, Analysis Function 368 and Notification Function 370 (both Analysis Function 368 and Notification Function 370 are shown and discussed in connection with FIG. 3).

User-input information, which is used to configure or control aspects of the operation of receiving station 18, may be collected using any type of now known or later-developed user/input interface(s) 404, such as a remote control, a mouse, a stylus, a keyboard, a microphone, or a display.

External communication interface(s) 450 are available to enhance the ability of receiving station 18 to receive or transmit information. External communication interface(s) 450 may be, or may include, elements such as cable modems, data terminal equipment, media players, data storage devices, personal digital assistants, or any other device or component/combination thereof, along with associated network support devices and/or software. For example, certain external communication interface(s) 450 may be adapted to support user notification of critical movement patterns through a variety of communication techniques now known or later developed—email, the Internet, telecommunication services, short-messaging services, and the like.

Figure 5:
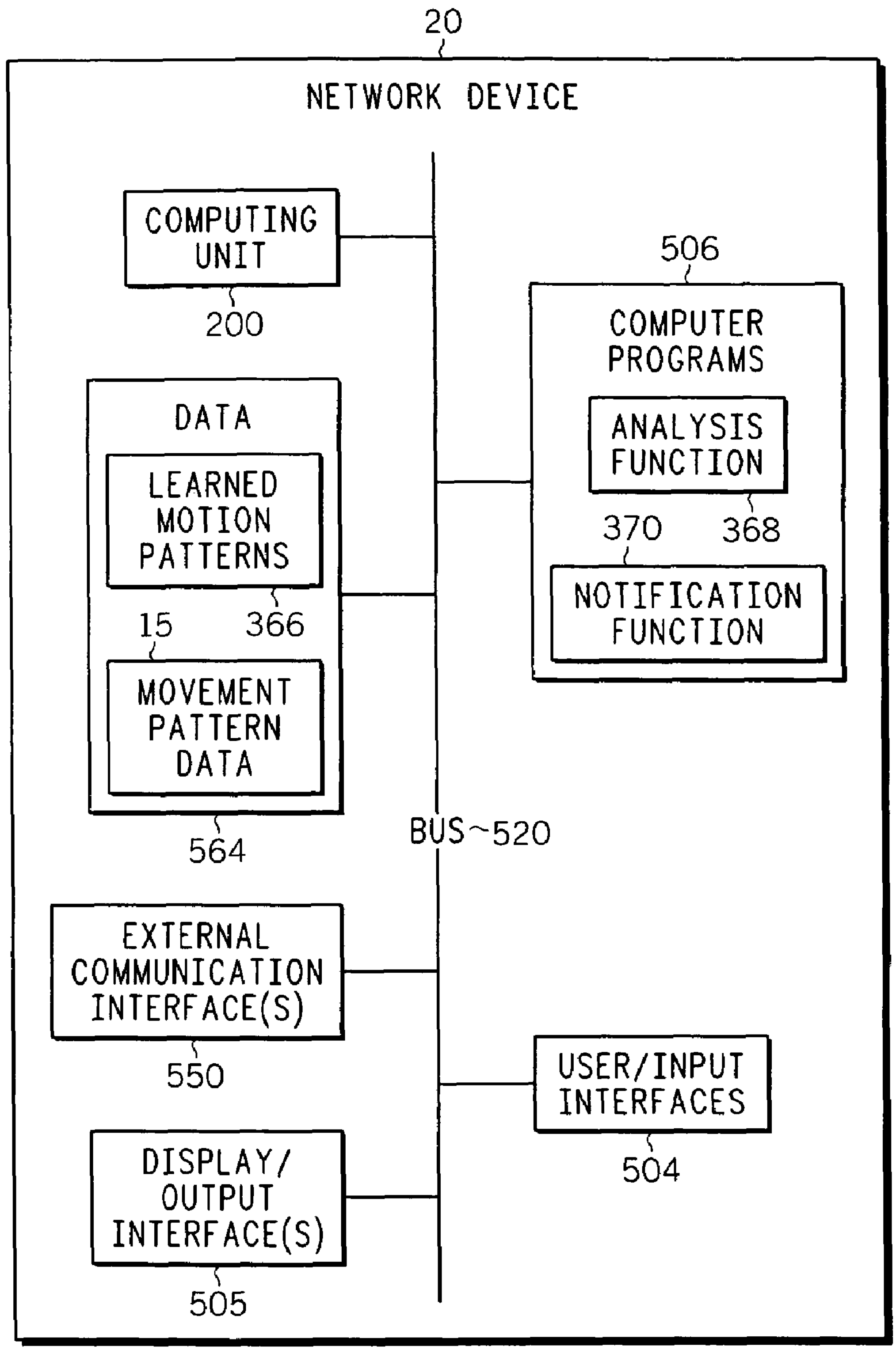
FIG. 5 is a block diagram of an exemplary internal configuration of the network device shown in FIG. 1.
Figure 6:
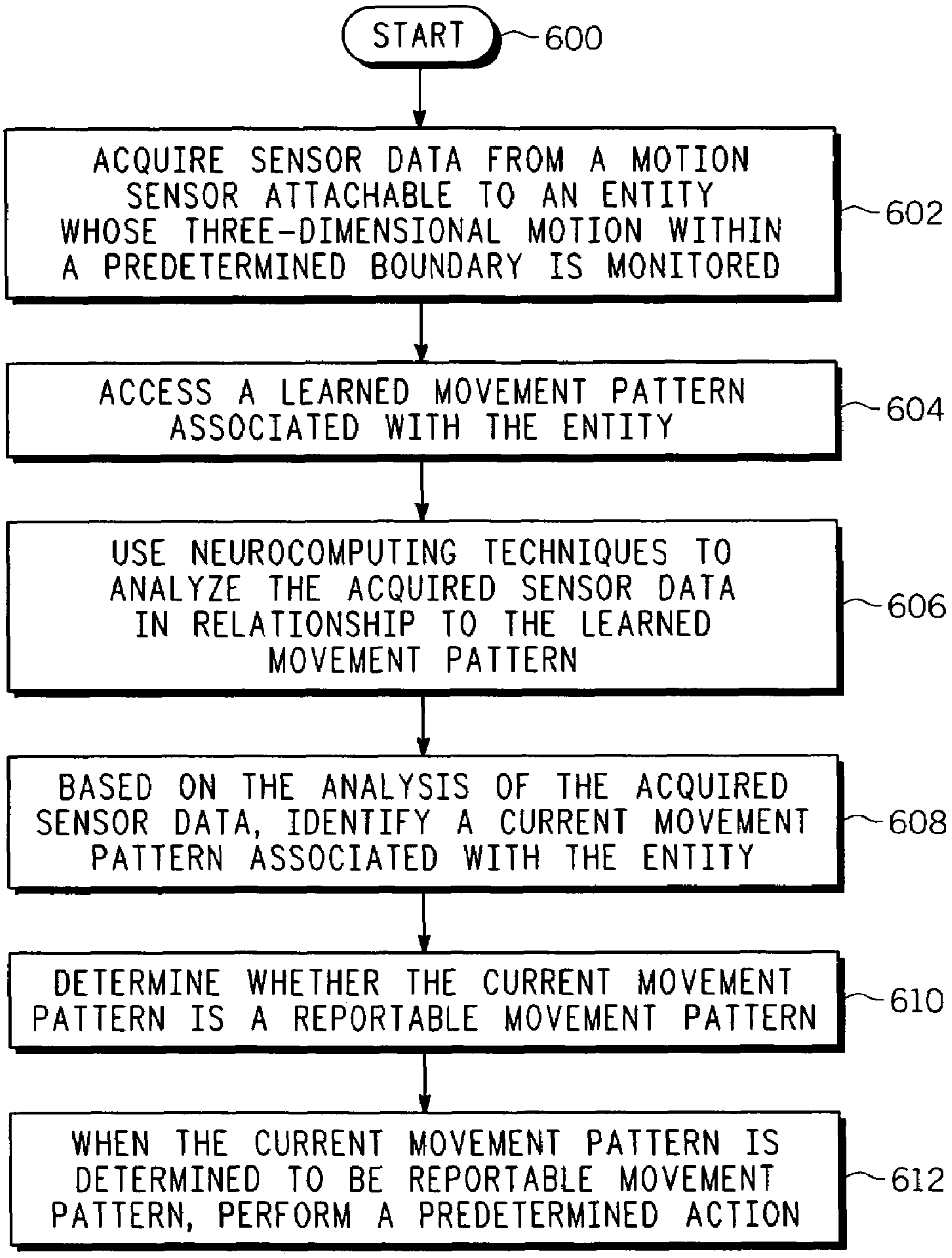
FIG. 6 is a flowchart of a method for monitoring motion of an entity within a predetermined boundary.

FIG. 5 is a block diagram of an exemplary internal configuration of network device 20 (shown in FIG. 1). Network device 20 includes or accesses components of computing unit 200 (shown in FIG. 2), including processor 202, computer-readable media 204, and computer programs 206. One or more internal buses 520, which are well-known and widely available elements, may be used to carry data, addresses, control signals and other information within, to, or from network device 20.

Network device 20 is configured for handheld or stationary operation outside of the predetermined boundary established by portable sensing unit 17 and/or receiving station 18. Network device 20 may be, among other things, a network service or server configured to receive movement pattern data 15 (movement pattern data 15 is shown in block 564, which is discussed further below), or a subset thereof (such as certain critical movement patterns performed by the entity to which portable sensing unit 17 is attached) from receiving station 18. Movement pattern data 15 may be received dynamically (in near real-time, for example), or it may be periodically downloaded.

Block 564 illustrates examples of data—related to receiving station 18's specific role in performing the function(s) of system 10 (shown in FIG. 1)—that may be stored on one or more types of computer-readable media 204 within, or accessible by, receiving station 18. Such data may include, but is not limited to, movement pattern data 15 and learned motion patterns 366 (shown and discussed in connection with FIG. 3).

Block 506 illustrates certain aspects of the functional arrangements of computer programs 206 related to network device 20's specific role in performing the function(s) of system 10 (shown in FIG. 1). Such computer programs include, but are not limited to, Analysis Function 368 and Notification Function 370 (both Analysis Function 368 and Notification Function 370 are shown and discussed in connection with FIG. 3).

User-input information, which may be used to configure or control aspects of the operation of network device 20, is collected using any type of now known or later-developed user/input interface(s) 504, such as a remote control, a mouse, a stylus, a keyboard, a microphone, or a display.

External communication interface(s) 550 are available to enhance the ability of network device 20 to receive or transmit information. External communication interface(s) 550 may be, or may include, elements such as cable modems, data terminal equipment, media players, data storage devices, personal digital assistants, or any other device or component/combination thereof, along with associated network support devices and/or software. For example, certain external communication interface(s) 550 may be adapted to support the user notification of critical movement patterns through a variety of communication techniques now known or later developed—email, the Internet, telecommunication services, short-messaging services, and the like.

With continuing reference to FIGS. 1-5, FIG. 6 is a flowchart of a method for monitoring motion of an entity, such as entity 12, within a predetermined boundary, such as boundary 14. The entity may be any person or tangible object, such as a child, a pet, or an item of tangible property. The boundary is established using GPS-based technology. The method is implemented when one or more computer programs, such as computer programs 206 associated with portable sensor unit 17, receiving station 18, or network device 20 (for example, Analysis Function 386 or Notification Function 370) are loaded into a processor, such as processor 202, and executed.

The method begins at block 600, and continues at block 602, where sensor data is acquired from a motion sensor, such as motion sensor 16, attachable to the entity.

For discussion purposes, it is assumed that motion sensor 16, which produces movement pattern data 15 based on the non-positional (for example, three-dimensional) movements of the entity to which motion sensor 16 is attached, is housed within portable sensing unit 17, and that portable sensing unit is 17 is attached to a person or an object.

Movement pattern data 15 may be acquired directly or indirectly from motion sensor 16. For example, portable sensing unit 17 may acquire movement pattern data 15, or the data may be acquired from portable sensing unit 17 by another device, such as receiving station 18 or network device 20. When movement pattern data is acquired indirectly, it is possible to collect the data either dynamically (for example, in near real-time) or by downloading the data, using suitable transmission media such as one or more transmission media 22, 26, or 26.

At block 604, a learned movement pattern associated with the entity is accessed. One or more learned motion patterns 366, which may be stored on one or more types of computer-readable media 204, may be accessed by (and/or stored on) portable sensing unit 17, receiving station 18, or network device 20.

Computing techniques, such as neurocomputing techniques, are used, at block 606, to analyze the acquired sensor data in relationship to the learned movement patterns.

Analysis Function 368 represents a data analysis application implemented using techniques such as neurocomputing techniques. Rules-based techniques such pattern classification techniques or fuzzy logic techniques may be used. Analysis Function 368 may be implemented on, or accessed by, in whole or in part, any element of system 10, such as portable sensing unit 17, receiving station 18, or network device 20. Inputs to Analysis Function 368 include motion pattern data 15 and learned motion patterns 366.

At block 608, a current movement pattern associated with the entity is identified, and at block 610, it is determined whether the current movement pattern is a reportable movement pattern.

Analysis Function 368 may determine whether a particular movement pattern identified within movement pattern data 15 is similar to a learned movement pattern 366, and may further determine whether or not the identified movement pattern is a critical movement pattern of the monitored entity, worthy of reporting to a user of a device or service associated with system 10.

Any sort of motion or lack thereof—normal or abnormal—may be deemed to be a reportable movement pattern. In addition, times or locations associated with reportable movement patterns may be defined. In one example, reportable movement patterns are similar to user-configured patterns of movement (which may be stored as one or more learned movement patterns 366 or parts thereof), such as movements that signal distress or a need for help (jumping up and down, or certain other repeated gestures, for example). In another example, reportable movement patterns are dissimilar to learned movement patterns 366 deemed to be 'normal'. In particular, abnormal accelerations may be reportable movement patterns that indicate trouble. An abnormal acceleration in the vicinity of a driveway may indicate that a child has been taken by an adult or put into a car; an abnormal acceleration of a child in the vicinity of a swing may indicate that the child fell off the swing; a lack of any acceleration or deceleration for an abnormally long time may indicate unconsciousness. It will be appreciated that any sort of motion or lack thereof, occurring at any specified time or place within boundary 14, may be deemed to be a reportable movement pattern.

The reportability of a movement pattern may also depend on when or where a movement pattern occurs. Temporary time- or location-based boundaries may be established. In one example, areas around sprinklers may be deemed out-of-bounds when the sprinklers are on. In another example, the backyard may be made out-of-bounds during spring months when it may be muddy. In yet another example, certain boundaries may be established using input from other physical-based monitoring systems such as security alarm systems or appliance monitoring systems (the kitchen may be out-of-bounds when the oven is on, for example, or the area outside the house may be out-of-bounds except when accessed by the front door). Boundaries may also be established by interactions between multiple assets—another motion sensor, such as one worn by a neighbor, may not be allowed within a certain distance of the monitored motion sensor, for example. Manual set-up options are also possible.

At block 612, when the current movement pattern is determined to be a reportable movement pattern, a predetermined action is performed.

Notification Function 370 represents one or more aspects of computer programs which, when executed, cause a user of a device or service associated with system 10 to be notified of certain critical movement patterns of the entity to which portable device 17 is attached. Notifications and related information may be provided to users in a variety of forms (audible, visible, or in a particular data format, for example), by any element within system 10, such as portable sensing unit 17, receiving station 18, or network device 20. External communication interface(s) 350, 450 or 550 may be used to provide further user notification options. For example, certain external communication interface(s) may be adapted to support the provisioning of user notification via a variety of communication techniques now known or later developed—email, the Internet, telecommunication services, short-messaging services, and the like. In addition, one or more elements of system 10 may be configured to control other devices or systems. Devices such as ovens or sprinklers may be turned off, for example, or alarms may be triggered in other monitoring systems, such as home security systems.

Services, systems, devices, and methods for tracking and reporting an entity's movements within a GPS-determined physical boundary have been described. Users concerned with monitoring the entity can obtain valuable information about the activity and safety of the entity that is not available from systems that only provide alerts regarding the entity's location. Parents or caregivers, for example, can be alerted to abnormal or dangerous motion patterns of their dependents, and can also be alerted to motions of their dependents that represent requests for help or signals of distress.

Exemplary configurations of system 10 and elements thereof have been described. It will be understood, however, that elements such as portable sensing unit 17, receiver station 18, and network device 20 may include fewer, more or different components or functions than described herein.

In one example, motion sensor 16 may be used alone, or in combination with more, fewer, or different components or functions than provided by portable sensing unit 17.

In another example, computing unit 200 may be used with a variety of general purpose or special purpose computers, devices, systems, or products, including but not limited to elements of system 10 (for example, one or more processors packaged together or with other elements of system 10 may implement functions described herein in a variety of ways), personal home or office-based computers, networked computers, personal communication devices, home entertainment devices, and the like.

In a further example, although data (such as movement pattern data 15 and learned motion patterns 366) and computer programs (such as Analysis Function 368 and Notification Function 370) are shown to exist within portable sensing unit 17, receiver station 18, and network device 20, such data/computer programs need not be disposed within, or accessed by, every element of system 10—design choices may dictate the specific element(s) of system 10 that store or access particular data, or that store or execute particular computer-executable instructions.

In a still further example, transmission media 22, 24 and 26 represent any one- or two-way, local or networked, public or private, wired or wireless information delivery infrastructure or technology now known or later developed, operated or supplied by any type of service provider. Examples of transmission media include, but are not limited to: digital or analog communication channels or protocols; data signals; computer-readable storage media; cable networks; satellite networks; telecommunication networks; the Internet; wide area networks; local area networks; fiber optic networks; copper wire networks; or any combination thereof.

It will also be understood that functions described herein are not limited to implementation by any specific embodiments of computer programs. Rather, functions are processes that convey or transform data, and may generally be implemented by, or executed in, hardware, software, firmware, or any combination thereof, located at, or accessed by, any combination of elements of system 10. Although certain functions herein may be implemented as "agents" and other functions as "clients", such functions need not be implemented using traditional client-server architectures.

It will further be understood that when one element is indicated as being responsive to another element, the elements may be directly or indirectly coupled. Connections depicted herein may be logical or physical in practice to achieve a coupling or communicative interface between elements. Connections may be implemented as inter-process communications among software processes.

As it is understood that embodiments other than the specific embodiments described above may be devised without departing from the spirit and scope of the appended claims, it is intended that the scope of this invention will be governed by the following claims.

The invention claimed is:

1. A method for monitoring motion of an entity within a predetermined boundary established using location detection technology, the method comprising:

acquiring sensor data from a motion sensor attachable to the entity, the motion sensor configured to dynamically sense non-positional movement of the entity within the predetermined boundary;

accessing a learned movement pattern associated with the entity;

using computing techniques, analyzing the acquired sensor data in relationship to the learned movement pattern;

based on the analysis of the acquired sensor data, identifying a current movement pattern associated with the entity;

determining whether the current movement pattern comprises a reportable movement pattern; and when the current movement pattern comprises reportable movement pattern, performing a predetermined action.

2. The method according to claim 1, wherein the non-positional movement of the entity comprises a three-dimensional movement of the entity.

3. The method according to claim 1, wherein the computing techniques comprise neurocomputing techniques.

4. The method according to claim 1, wherein the step of performing a predetermined action based on the reportable movement pattern comprises communicating existence of the reportable movement pattern in such a manner that a person is caused to be alerted to the existence of the reportable movement pattern.

5. The method according to claim 1, wherein the step of acquiring sensor data comprises one of downloading sensor data and receiving sensor data in real-time.

6. The method according to claim 1, wherein the learned movement pattern comprises one of a pre-programmed movement pattern and a movement pattern trained using neurocomputing techniques.

7. The method according to claim 1, further comprising: updating the learned movement pattern based on the acquired sensor data.

8. The method according to claim 1, wherein the reportable movement pattern is substantially similar to the learned movement pattern.

9. The method according to claim 1, wherein the reportable movement pattern is substantially different than the learned movement pattern.

10. The method according to claim 1, wherein the motion sensor comprises one of an accelerometer and a gyroscope.

11. The method according to claim 1, wherein the location detection technology comprises a GPS-based technology.

12. A computer-readable medium encoded with a computer program which, when loaded into a processor, implements the method of claim 1.

13. An apparatus for monitoring motion of an entity within a predetermined boundary established using location detection technology, the apparatus comprising:

an interface for receiving sensor data acquired from a motion sensor attachable to the entity, the motion sensor configured to dynamically sense non-positional movement of the entity within the predetermined boundary;

a computer-readable storage medium operative to receive the acquired sensor data via the interface; and a processor responsive to the computer-readable storage medium and to a computer program, the computer program, when loaded into the processor, operable to:

access a learned movement pattern associated with the entity;

analyze the acquired sensor data in relationship to the learned movement pattern;

based on the analysis of the acquired sensor data, identify a current movement pattern associated with the entity;

determine whether the current movement pattern comprises a reportable movement pattern; and when the current movement pattern comprises a reportable movement pattern, perform a predetermined action.

14. The method according to claim 13, wherein the non-positional movement of the entity comprises a three-dimensional movement of the entity.

15. The method according to claim 13, wherein the computing techniques comprise neurocomputing techniques.

16. The method according to claim 13, wherein the location detection technology comprises a GPS-based technology.

17. The apparatus according to claim 13, wherein the computer-readable medium and the processor are disposed in a portable device attachable to the entity.

18. The method according to claim 13, wherein the computer-readable medium and the processor are disposed in a receiving station configured for operating within the predetermined boundary to wirelessly receive the sensor data, and wherein the receiving station is configured to notify the user of the service that the reportable movement pattern occurred.

19. The method according to claim 13, wherein the computer-readable medium and the processor are disposed in a device configured to operate in a communication network outside of the predetermined boundary, and wherein a communication modality responsive to the communication network is configured to notify the user of the service that the reportable movement patterns occurred.

20. The method according to claim 13, wherein the communication modality comprises one of an email service, an Internet-based communication service, a telecommunication service, and a short-messaging service.

* * * * *